(12) United States Patent
Ito et al.

(10) Patent No.: US 8,113,715 B2
(45) Date of Patent: Feb. 14, 2012

(54) FLUID DYNAMIC BEARING DEVICE

(75) Inventors: Kenji Ito, Kuwana (JP); Isao Komori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 701 days.

(21) Appl. No.: 12/294,485

(22) PCT Filed: Feb. 2, 2007

(86) PCT No.: PCT/JP2007/051759
§ 371 (c)(1),
(2), (4) Date: Sep. 25, 2008

(87) PCT Pub. No.: WO2007/111042
PCT Pub. Date: Oct. 4, 2007

(65) Prior Publication Data
US 2010/0232733 A1  Sep. 16, 2010

(30) Foreign Application Priority Data

Mar. 28, 2006 (JP) .................. 2006-088798

(51) Int. Cl.
*F16C 32/06* (2006.01)
(52) U.S. Cl. ................ 384/107; 384/100; 384/112
(58) Field of Classification Search .......... 384/100, 384/107, 114, 121, 123
See application file for complete search history.

(56) References Cited

U.S. PATENT DOCUMENTS

| 6,456,458 | B1 | 9/2002 | Ichiyama |
| 2003/0169952 | A1 | 9/2003 | Yamashita et al. |
| 2005/0025405 | A1 | 2/2005 | Tamaoka |
| 2005/0244086 | A1 | 11/2005 | Murata et al. |

FOREIGN PATENT DOCUMENTS

| JP | 2000-197309 A | 7/2000 |
| JP | 2001-289243 A | 10/2001 |
| JP | 2003-65324 A | 3/2003 |
| JP | 2003-239951 A | 8/2003 |
| JP | 2004-92446 A | 3/2004 |
| JP | 2005-315357 A | 11/2005 |
| JP | 2005-315408 A | 11/2005 |
| JP | 2005-337342 A | 12/2005 |
| JP | 2006-38211 A | 2/2006 |

OTHER PUBLICATIONS

Machine Translation of Japanese document 2001-289243, no date.*
International Search Report of PCT/JP2007/051759, date of mailing Apr. 10, 2007.

* cited by examiner

*Primary Examiner* — Thomas R Hannon
(74) *Attorney, Agent, or Firm* — Westerman, Hattori, Daniels & Adrian, LLP

(57) ABSTRACT

In this type of fluid dynamic bearing device, a dynamic pressure generating part having high molding accuracy is formed at low cost.

A rotating member 2 includes a shaft part 9, and a holding member 10 as a thrust member provided in one end of the shaft part 9. In a partial annular region of a lower end surface 10$a$1 of a disk part 10$a$ making up the holding member 10, a region where a plurality of dynamic pressure grooves 10$a$2 and a plurality of sectioning parts 10$a$3 formed between the plurality of dynamic pressure grooves 10$a$2 to section the respective dynamic pressure grooves 10$a$2 are arrayed spirally is formed. The above-described dynamic-pressure-groove 10$a$2 arrayed region is opposed to an upper end surface 8$a$ of a housing part 8, and forms a thrust bearing clearance of a thrust bearing part T between the dynamic-pressure-groove 10$a$2 and the upper end surface 8$a$ during the rotation of the shaft part 9. The above-described dynamic-pressure-groove 10$a$2 arrayed region is molded in the lower end surface 10$a$1 of the holding member 10 by press working.

5 Claims, 4 Drawing Sheets

FLUID DYNAMIC BEARING DEVICE

FIELD OF THE INVENTION

The present invention relates to a fluid dynamic bearing device.

BACKGROUND ART

A fluid dynamic bearing device supports a rotating member in a non-contact state by a dynamic pressure effect of a fluid created in a bearing clearance between a fixed member and the rotating member. This type of bearing device has characteristics of high-speed rotation, high rotation accuracy, low noise and the like, and is preferably used as a bearing device for a motor mounted on various types of electric equipment including information equipment, more specifically, as a bearing device for a spindle motor of a disk drive in a magnetic disk device such as HDD, an optical disk device such as CD-ROM, CD-R/RW, and DVD-ROM/RAM, and a magnetic optical disk device such as MD and MO, or as a bearing device for a motor such as a polygon scanner motor of a laser beam printer (LBP), a color wheel motor of a projector and a fan motor.

For example, in a fluid dynamic bearing device incorporated in a spindle motor of a disk drive device such as HDD, there is known one in which both a radial bearing part supporting a shaft member in a radial direction and a thrust bearing part supporting the same in a thrust direction are made of fluid dynamic bearings. As the thrust bearing part in this type of the fluid dynamic bearing device, there is known one in which dynamic pressure grooves as a dynamic pressure generating part are formed, for example, in either of an end surface of a flange part making up the rotating member and a surface opposed to this, for example, a lower end surface of a sleeve part making up a fixed member and an upper end surface of a bottom part of a housing (thrust bearing surface), and a thrust bearing clearance is formed between both the end surfaces (e.g., refer to Patent Document 1).

Moreover, in this fluid dynamic bearing device, normally, in order to prevent a lubricating oil injected into an internal space of the housing from leaking to the outside, a seal member is disposed in an opening part of the housing communicated to a radial bearing clearance. Therefore, a seal space formed between the seal member and the rotating member (e.g., a shaft member) is often formed on one end side in an axial direction of the radial bearing clearance (e.g., refer to Patent Document 2).

Moreover, with a recent trend toward enhanced portability and downsizing of information equipment, demands for downsizing and reduction in thickness to a fluid dynamic bearing device mounted on such information equipment or the like have also been increased.

As this type of fluid dynamic bearing device constituted so as to achieve reduction in thickness, for example, there is a fluid dynamic bearing device described in Japanese Patent Application Laid-Open No. 2005-315408. This is characterized in that a seal space, which in many conventional cases, has been provided on one end opening side of a fixed member, in other words, on one end opening side of a radial bearing clearance, is formed radially outside of the radial bearing clearance, which reduces an axial dimension of the fluid dynamic bearing device by the seal space. In this case, a thrust bearing clearance is often formed between a lower end surface of a hub forming the seal space between an outer circumferential surface of the housing and the hub, and an upper end surface of the housing opposed to this.

[Patent Document 1] Japanese Patent Application Laid-Open No. 2003-239951
[Patent Document 2] Japanese Patent Application Laid-Open No. 2003-65324
[Patent Document 3] Japanese Patent Application Laid-Open No. 2005-315408

DISCLOSURE OF THE INVENTION

Problems to be Solved by the Invention

While the formation of the housing in this type of fluid dynamic bearing device has been conventionally performed by metal machining, the adoption of plastic forming such as casting, for example, has recently been considered instead of the machining in terms of low cost. In this case, for simplification of the working process, dynamic pressure grooves for creating a dynamic pressure effect of a fluid in a thrust bearing clearance with respect to a hub can also be provided in an end surface of the housing by plastic forming shared with the housing. However, since the housing forms the seal space between its outer circumferential surface and the hub, the outer circumferential surface is often formed into a tapered shape. This makes it difficult to shape the dynamic pressure grooves with high accuracy because when the dynamic pressure grooves are formed in the end surface of the housing by the plastic forming, the thickness of the housing varies depending on the pressing position, which makes it difficult to obtain uniform pressing force over the whole end surface.

In Patent Document 3, the effect that the dynamic pressure grooves are molded by injection molding of a resin in the lower end surface of the hub opposed to the upper end surface of the housing in place of the upper end surface of the housing is described. However, in this case, since the hub is formed of the resin, deformation of the dynamic pressure grooves due to contraction during molding cannot be avoided, which makes it difficult to form the dynamic pressure grooves with high accuracy.

An issue of the present invention is to form a dynamic pressure generating part having high molding accuracy at low cost in this type of fluid dynamic bearing device.

Means for Solving the Problems

In order to solve the above-described issue, the present invention provides a fluid dynamic bearing device including a fixed member, a rotating member, a radial bearing clearance formed between the fixed member and the rotating member, a first end of which is on the hermetically sealed side, and a second end of which is on the atmosphere opening side, a thrust bearing clearance formed between the fixed member and the rotating member and leading to the atmosphere opening side of the radial bearing clearance, a thrust member provided in the rotating member and forming the thrust bearing clearance between the fixed member and the thrust member, and a dynamic pressure generating part for generating a dynamic pressure effect of a fluid in the thrust bearing clearance, the fluid dynamic bearing device characterized in that the thrust member is made of a metal, and the dynamic pressure generating part is molded in the thrust member by press working.

As described above, by making, of a metal, the thrust member provided with the dynamic pressure generating part, a defect caused when the dynamic pressure generating part is provided in the fixed member, or decrease in moldability attributed to a material of the rotating member and the like can be avoided. Moreover, if the dynamic pressure generating part is molded by press working, for example, by manufacturing a high-accuracy die in advance, molding accuracy of the dynamic pressure generating part can be improved to thereby increase the dynamic pressure effect of the fluid created in the thrust bearing clearance. Moreover, molding the dynamic pressure generating part by press working can increase mass productivity, resulting in reduction of manufacturing cost.

Both the dynamic pressure generating part and the thrust member are preferably molded by press working. Molding both by press working allows for molding both in common press process, for example, which can simplify the working process, and bring about further reduction in cost.

When the dynamic pressure generating part is molded in the thrust member, a portion where the dynamic pressure generating part is molded desirably has a constant thickness, which can further increase the molding accuracy of the dynamic pressure generating part. Moreover, since the thrust member having an even thickness enables the previously-described press molding to be performed more accurately, geometric accuracy of the thrust member required during the rotation, such as flatness of the thrust bearing surface and squareness with respect to a shaft part, can be satisfied, thereby exerting high bearing performance.

In the rotating member including the thrust member, as portions requiring high shape accuracy, for example, as described above, an end surface of the thrust member forming the thrust bearing clearance between the fixed member and the end surface (portion where the dynamic pressure generating part is formed), a surface forming the radial bearing clearance between the fixed member and the surface itself, for example, an outer circumferential surface of the shaft part provided in the center of the thrust member, and the like can be cited. Moreover, the rotating member is used with various components attached thereto in accordance with an application and a use aspect thereof, for example, in the case where the fluid dynamic bearing device is used by being incorporated in a disk drive device such as HDD, the rotating member is provided with the thrust member and a disk loading surface for loading a disk such as a magnetic disk. Obviously, since the disk loading surface directly links with reading accuracy of the disk, shape accuracy of the disk loading surface, for example, flatness, squareness with respect to a rotating shaft center of the rotating member and the like need to be high in finishing. In this case, for example, by forming the disk loading surface by a metallic thrust member, the above-described shape accuracy of the disk loading surface having high shape accuracy is increased, so that the reading accuracy of the disk can be improved. In this case, a hub having the disk loading surface or the like corresponds to the thrust member.

Moreover, for example, in the case where the above-described fluid dynamic bearing device is used, for example, by being incorporated in a fan motor, the rotating member is provided with a fan having a shape in accordance with an air blast aspect thereof. In this case, since the fan does not require so high shape accuracy as compared with the bearing surface and the disk loading surface described above, for example, the fan can be formed integrally with the thrust member by injection molding of a resin with the thrust member used as an insert component. In this manner, the portion having high shape accuracy is formed by the metallic thrust member, or is formed by press-molding of the thrust member, and the portion not requiring so high accuracy is formed by injection molding of a resin excellent in cost. With this configuration, the rotating member excellent in terms of accuracy and cost can be obtained. In this case, a supporting member for fixing the fan to the shaft member, a yoke that is provided inside of the supporting member or the like and serving as an attachment part of a rotor magnet or the like corresponds to the thrust member. Moreover, these components of the rotating member themselves need not to be the thrust member, but the thrust member may be a portion of each of the components.

EFFECT OF THE INVENTION

As described above, according to the present invention, in this type of fluid dynamic bearing device, the dynamic pressure generating part having high molding accuracy can be formed at low cost.

Figure 1:
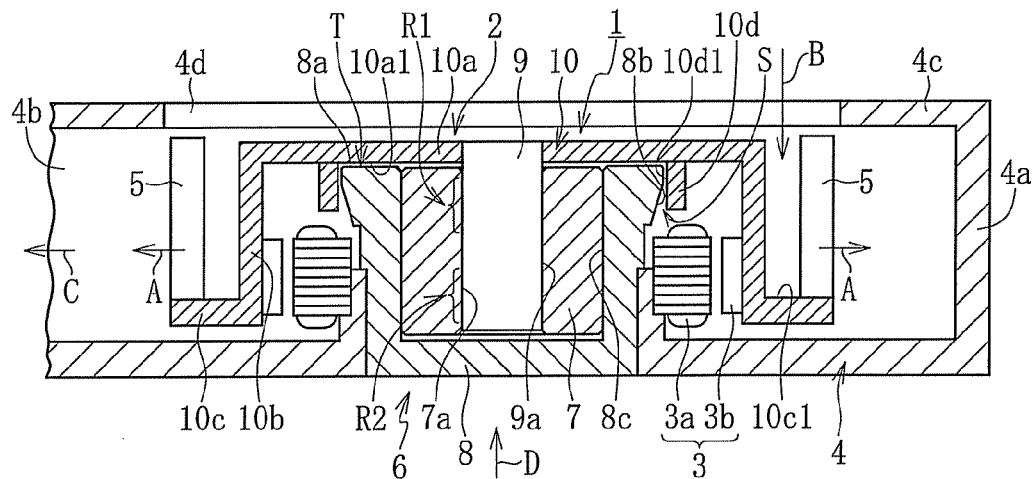
FIG. 1 is a cross-sectional view of a fan motor in which a fluid dynamic bearing device according to a first embodiment of the present invention is incorporated.

DESCRIPTION OF REFERENCE NUMERALS 1. fluid dynamic bearing device
2. rotating member
5. fan
6. fixed member
9. shaft part
10. holding part (thrust member)
10$a$1. lower end surface
10$a$2. dynamic pressure groove
11. fluid dynamic bearing device
12. rotating member
20. hub part (thrust member)
20$c$. flange part
20$d$. disk loading surface
R1, R2. radial bearing part
T. thrust bearing part
S. seal space

BEST MODE FOR CARRYING OUT THE INVENTION

Hereinafter, a first embodiment of the present invention is described based on FIGS. 1 to 4. "Up and down" directions in the following description are only defined for easy understanding of position relations between components in the respective figures, and does not specify setting directions, use aspects and the like in a fluid dynamic bearing device.

Figure 2:
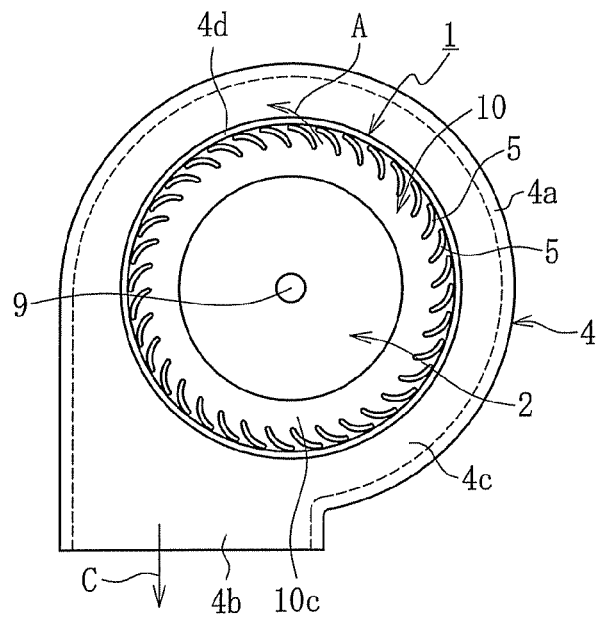
FIG. 2 is a plane view of the fan motor.

FIG. 1 shows a longitudinal sectional view of a fan motor in which a fluid dynamic bearing device 1 according to the first embodiment of the present invention is incorporated, and FIG. 2 shows a plane view of the same fan motor, respectively. The fan motor in this embodiment is a so-called sirocco fan motor including a fluid dynamic bearing device 1 that rotatably supports a rotating member 2 having a shaft part 9, a drive part 3 made of, for example, a stator coil 3$a$ and a rotor magnet 3$b$ opposed to each other through a radial gap, and a base 4 that fixes a fixed member 6 of the fluid dynamic bearing device 1 to an inner circumferential thereof, and is attached to a component to be cooled (the illustration is omitted). At one end of the shaft part 9, a holding member 10 for holding fans 5 is attached, and is provided with the plurality of fans 5 upright thereacross in a circumferential direction on the outer diameter side of the holding member 10. In the base 4, the stator coil 3a is provided, and on the inner diameter side of the holding member 10, the rotor magnet 3b is fixed. Moreover, in this embodiment, an opening part 4b is provided in a partial region in a circumferential direction of an outer wall part 4a of the base 4. The opening part 4b acts as an exhaust port of an exhaust flow sent to the outer diameter side during driving of the fan motor. Moreover, in an upper end of the outer wall part 4a, a partially-annular upper wall part 4c extending toward the inner diameter side is provided, and in an inner circumference of the upper wall part 4c, a hole 4d is formed.

When the stator coil 3a is energized, the rotor magnet 3b is rotated by excitation force between the stator coil 3a and the rotor magnet 3b. With this configuration, the plurality of fans 5 provided upright in the holding member 10 are rotated integrally with the shaft part 9. This rotation allows each of the fans 5 to create an air flow in an outer diameter direction (direction of arrow A in FIG. 1), and a suction flow is created from the hole 4d downward in an axial direction (direction of arrow B in FIG. 1) in the form of being sucked by the above-described air flow. On the other hand, the exhaust flow is created in a direction of arrow C in FIG. 1 in the form of being pushed out by the air flow toward the outer diameter direction so as to be exhausted outside through the opening part 4b provided in the outer wall part 4a.

In this embodiment, the fluid dynamic bearing device 1 is made up of the fixed member 6 and the rotating member 2.

In this embodiment, the fixed member 6 includes a substantially cylindrical sleeve part 7 and a housing part 8 located on the outer diameter side of the sleeve part 7 and formed integrally with, or separately from the sleeve part 7.

The sleeve part 7 is, for example, a porous body made of a sintered metal and is formed into a cylindrical shape. In this embodiment, the sleeve part 7 is a porous body made of a sintered metal mostly composed of copper, and formed into a cylindrical shape, and further fixed to an inner circumferential surface 8c of the housing part 8 by appropriate means such as adhesion (including loose adhesion), press-fitting (including press-fitting adhesion), and deposition (including ultrasonic deposition), for example. Obviously, the sleeve part 7 can also be formed of a material other than metal, such as a resin and ceramics. Moreover, in addition to the porous body of the sintered metal or the like, the sleeve part 7 can also be formed of a material having a structure having no internal pores, or only internal pores of a size disabling a lubricating oil to come in and out.

Figure 3:
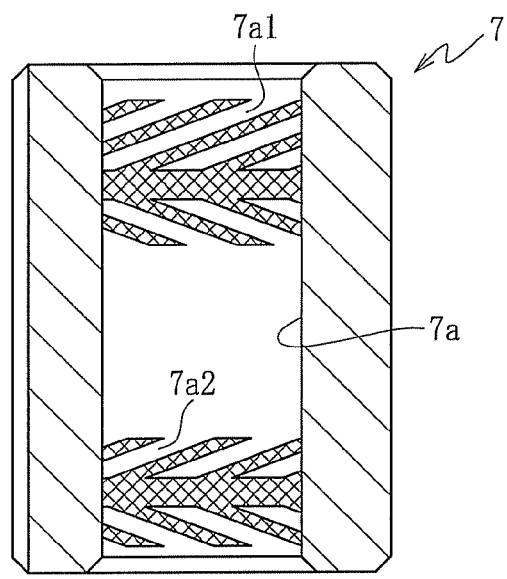
FIG. 3 is a cross-sectional view of a sleeve part.

In the whole surface or partial cylindrical regions of an inner circumferential surface 7a of the sleeve part 7, regions where a plurality of dynamic pressure grooves are arrayed are formed as radial dynamic pressure generating parts. In this embodiment, for example, as shown in FIG. 3, regions where a plurality of dynamic pressure grooves 7a1, 71a2 are arrayed in a herringbone shape are formed in two positions apart from each other in the axial direction.

The housing part 8 is formed of a metal or a resin into a substantially cylindrical shape. In this embodiment, the housing part 8 is formed into a bottomed cylindrical shape with one end thereof in the axial direction opened. In an upper outer circumference of the housing part 8 (outer circumference of an end portion on an upper end surface 8a side), an annular tapered surface 8b whose diameter is gradually enlarged upward is formed.

The rotating member 2, in this embodiment, mainly includes the shaft part 9 inserted onto the inner circumference of the sleeve part 7, the holding member 10 provided in an upper end of the shaft part 9 and arranged on the opening side of the fixed member 6, and the plurality of fans 5 provided on the outer diameter side of the holding member 10.

The shaft part 9, in this embodiment, is formed of a metal material separately from the holding member 10. An outer circumferential surface 9a of the shaft part 9 is opposed to the dynamic-pressure-groove 7a1, 7a2 formed regions which are formed in the inner circumferential surface 7a of the sleeve part 7. The outer circumferential surface 9a forms radial bearing clearances of first and second radial bearing parts R1, R2 described later, respectively, between the outer circumferential surface 9a and the dynamic-pressure-groove 7a1, 7a2 formed regions during rotation of the shaft part 9 (refer to FIG. 1).

The holding member 10 includes a disk part 10a located on the opening side (upper side) of the fixed member 6, a cylindrical part 10b extending from an outer circumferential portion of the disk part 10a downward in the axial direction, and a flange part 10c protruded from a lower end portion of the cylindrical part 10b to the outer diameter side. As described above, the rotor magnet 3b is fixed to an inner circumference of the cylindrical part 10b, and the plurality of fans 5 are provided upright in an upper end surface 10c1 of the flange part 10c.

Figure 4:
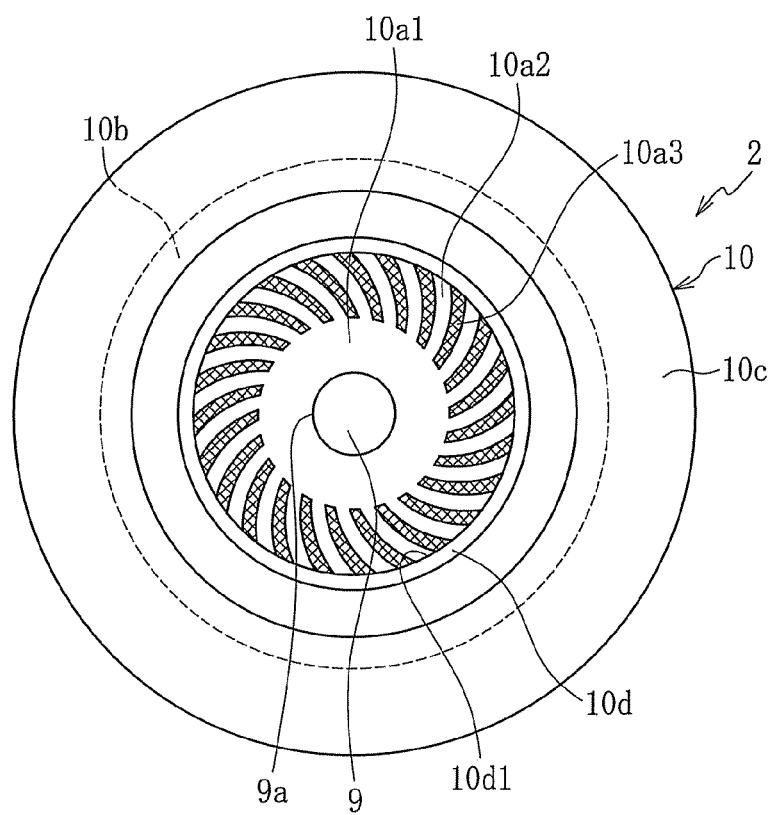
FIG. 4 is a lower end view when a thrust member is viewed from a direction of arrow D.

In a partial annular region of a lower end surface 10a1 of the disk part 10a, a region where a plurality of dynamic pressure grooves are arrayed is formed as a dynamic pressure generating part. In this embodiment, for example, as shown in FIG. 4, a region where a plurality of dynamic pressure grooves 10a2 and sectioning parts 10a3 that are formed between the plurality of dynamic pressure grooves 10a2 to section the respective dynamic pressure grooves 10a2 are arrayed spirally is formed. Therefore, in this embodiment, the holding member 10 corresponds to a thrust member. Moreover, in this embodiment, groove bottom surfaces of the dynamic pressure grooves 10a2 are in the same plane as the lower end surface 10a1 continuing to these dynamic pressure grooves 10a2. The above-described dynamic-pressure-groove 10a2 arrayed region is opposed to the upper end surface 8a of the housing part 8 to form a thrust bearing clearance of a thrust bearing part T described later between the dynamic-pressure-groove 10a2 and the upper end surface 8a during the rotation of the shaft part 9 (rotating member 2) (refer to FIG. 2).

In a region of the lower end surface 10a1 on the outer diameter side from the dynamic-pressure-groove 10a2 arrayed region, for example, an annular protruded part 10d is provided. In this embodiment, the protruded part 10d is formed integrally with the holding member 10 by injection molding of a resin with the holding member 10 used as an insert component together with the fans 5. An inner circumferential surface 10d1 of the protruded part 10d is opposed to the tapered surfaces 8b of the housing part 8 to form, between the inner circumferential surface 10d1 and this tapered surface 8b, a tapered seal space S whose radial clearance dimension is gradually reduced upward. After assembling, an oil level of the lubricating oil is constantly maintained within the seal space S in a state where the inside of the fluid dynamic bearing device 1 is filled with the lubricating oil.

The holding member 10 is formed into the above-described shape with a metal material including a soft metal such as, for example, brass. In the lower end surface 10a1 of the holding member 10, the dynamic-pressure-groove 10a2 arrayed region shown in FIG. 4 is molded by press working.

At this time, a height from the groove bottom surfaces of the dynamic pressure grooves 10a2 to upper end surfaces of the sectioning parts 10a2 formed by the press molding, in other words, a groove depth of the dynamic pressure grooves 10a2 is, for example, 2 μm or more and 15 μm or less.

Thus, by molding the plurality of dynamic pressure grooves 10a2 as the dynamic pressure generating part in the lower end surface 10a1 of the holding member 10 serving as a thrust member by press working, the dynamic pressure grooves 10a2 can be formed with high accuracy and at low cost. Particularly, as in this embodiment, applying press molding to the portion having a constant thickness (disk part 10a) can further increase the molding accuracy. Moreover, at the same time as the press molding of the above-described dynamic pressure grooves 10a2, the press molding is applied to the disk part 10a of the holding member 10 and other regions (cylindrical part 10b and the like), thereby improving (correcting) shape accuracy of the holding member 10. Finishing processing by this type of press working can provide merits of shortened working time, simplified cleaning process after working with suppressing the generation of chips and the like, so that not only cost reduction but also increased productivity can be achieved.

Moreover, while the holding member 10 can also be formed by cutting working and the like, as shown in FIG. 2, the holding member 10 can also be formed by press working in the case where the holding member 10 is in a form of sheet. In this case, by performing the press molding of the dynamic pressure grooves 10a2 at the same time as the press molding of the holding member 10, the molding process can be simplified to further increase the productivity.

Moreover, in order to further increase the molding accuracy of the dynamic pressure grooves 10a2, for example, although the illustration is omitted, relief portions deeper (thinner) than the groove bottoms of the dynamic pressure grooves 10a2 can also be formed in one or both of a region on the inner diameter side and a region on the outer diameter side adjacent to the dynamic-pressure-groove 10a2 arrayed region in the lower end surface 10a1. By forming these relief portions before the press molding of the dynamic pressure grooves 10a2, excess thickness during plastic deformation of a metallic structure is absorbed when the dynamic press grooves 10a2 (and the sectioning parts 10a3) are press-molded. This enables high-accuracy molding of the dynamic pressure grooves 10a2 (and the seconding parts 10a3).

Moreover, as in this embodiment, the protruded part 10d and the fans 5 are formed by injection molding of a resin with the metallic holding member 10 used as an insert component, so that by applying press-working of metal to the portion requiring high shape accuracy as in the dynamic-pressure-groove 10a2 arrayed region, and forming with resin mold parts the portions not requiring so high shape accuracy such as surface shapes of the inner circumferential surface 10d1 of the protruded part 10d and the fans 5, both high accuracy and low cost of the rotating member 2 can be achieved.

In the fluid dynamic bearing device 1 having the above-described constitution, the dynamic-pressure-groove 7a1, 7a2 formed regions formed in the inner circumferential surface 7a of the sleeve part 7 form radial bearing clearances between the dynamic-pressure-groove 7a1, 7a2 formed regions and the opposed outer circumferential surface 9a of the shaft part 9 during the rotation of the shaft part 9. With the rotation of the shaft part 9, the lubricating oil in the above-described radial bearing clearances is pushed into the axial center side of the dynamic pressure grooves 7a1, 7a2 to raise the pressure. In this manner, the dynamic pressure effects of the lubricating oil created by the dynamic pressure grooves 7a1, 7a2 make up a first radial bearing part R1 and a second radial bearing part R2 supporting the shaft part 9 in the radial direction in a non-contact state, respectively.

At the same time, pressure of a lubricating oil film formed in the thrust bearing clearance between the dynamic-pressure-groove 10a2 arrayed region formed in the lower end surface 10a1 of the holding member 10 as the thrust member, and the upper end surface 8a of the housing part 8 opposed to the region is increased by the dynamic pressure effect of the dynamic pressure grooves 10a2. The pressure of the oil film makes up the thrust bearing part T supporting the rotating member 2 (holding member 10) in a thrust direction in a non-contact state.

While as described above, the first embodiment of the present invention has been described, the present invention is not limited to this embodiment, but can be applied to a fluid dynamic bearing device according to another constitution.

Figure 5:
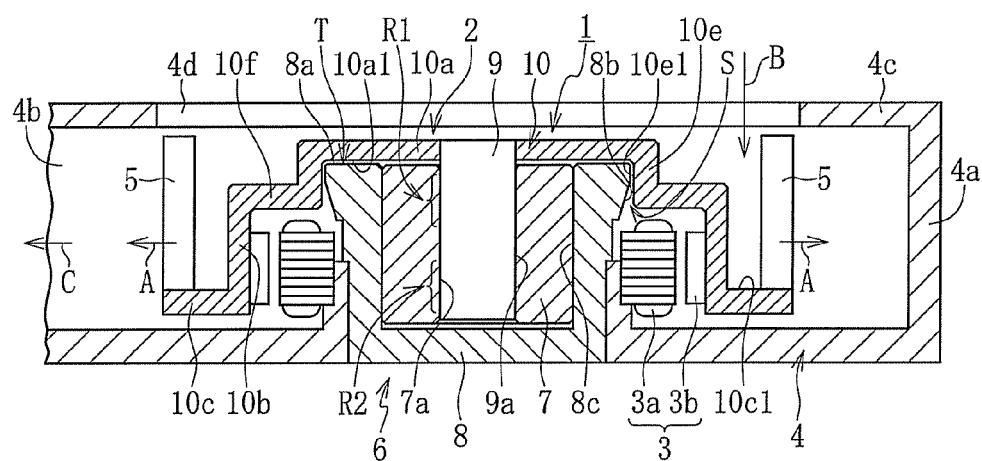
FIG. 5 is a cross-sectional view of a fluid dynamic bearing device according to another constitution.

While in the above-described first embodiment, the case where the protruded part 10d is provided integrally with the holding member 10 as a mold part, and the seal space S is formed between the inner circumferential surface 10d1 of the protruded part 10d and the tapered surface 8b of the housing part 8 is described, a constitution other than this can also be adopted. That is, the protruded part 10d is not required for forming the seal space S, but partial change in shape of the holding member 10 also allows the seal space to be formed between the housing part 8 (fixed member 6) and holding member 10. FIG. 5 shows one example thereof, in which a second cylindrical part 10e extending downward from an outer peripheral edge of the disk part 10a and a second flange part 10f thrown out from a lower end of the second cylindrical part 10e toward the outer diameter side to be coupled to an upper end portion of the cylindrical part 10b are provided between the disk part 10a and the cylindrical part 10b of the holding member 10. An inner circumferential surface 10e1 of the second cylindrical part 10e forms the tapered seal space S between the inner circumferential surface 10e1 and the tapered surface 8b of the housing part 8 opposed to the inner circumferential surface 10e1. In this manner, by forming the region requiring high surface accuracy such as the seal surface by the metallic holding member 10 that can be press-molded, decrease in surface accuracy due to contraction during molding as in a resin mold part can be avoided to thereby form a seal surface (inner circumferential surface 10e1) having high surface accuracy.

While in the above-described embodiment, the holding member 10 attached to one end of the shaft part 9 and holding one or a plurality of fans 5 is the thrust member, the present invention is not limited to this. That is, in the case of the fluid dynamic bearing device 1 shown in FIGS. 1 and 5, a member other than the holding member 10, for example, a yoke that is an attachment part of the rotor magnet 3b, or the like may be a thrust member, as long as the thrust member forms the thrust bearing clearance of the thrust bearing part T between the thrust member itself and the upper end surface 8a of the housing part 8. Alternatively, a metallic member partially composing the holding member 10 may be a thrust member. In this case, with such a thrust member used as an insert component, the remaining portion of the holding member 10 and the fans 5 can also be integrally molded using a resin or the like.

While in the above-described embodiment, the case where the fluid dynamic bearing device 1 is used by being incorporated in a fan motor is described, the fluid dynamic bearing device can be used for applications other than this. Hereinafter, a second embodiment of the present invention is described based on FIG. 6. The same reference numerals are given to elements having the same constitutions and operations as those in the above-described first embodiment, and their descriptions are omitted.

Figure 6:
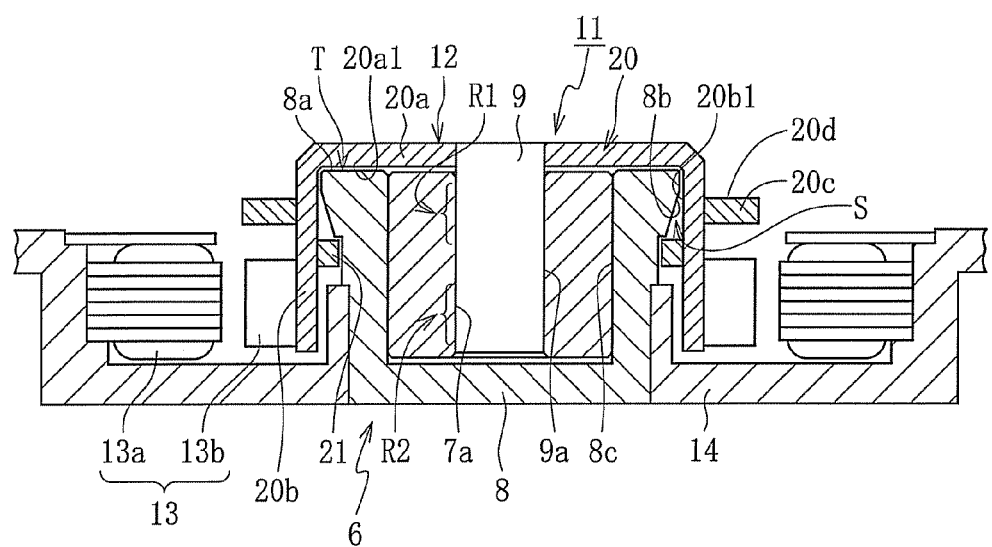
FIG. 6 is a cross-sectional view of a spindle motor in which a fluid dynamic bearing device according to a second embodiment is incorporated.

FIG. 6 conceptually shows one constitutional example of a motor including a fluid dynamic bearing device according to the second embodiment of the present invention. This motor is used for a disk drive device such as HDD, for example, and includes a fluid dynamic bearing device 11 supporting a rotating member 12 having the shaft part 9 and a hub part 20 in the radial direction in a non-contact state, a drive part 13 made of a stator coil 13a and a rotor magnet 13b opposed to each other through a radial gap, for example, and a bracket 14. The stator coil 13a is fixed to the bracket 14, and the rotor magnet 13b is fixed to an outer circumference of the hub part 20. The housing part 8 of the fluid dynamic bearing device 11 is fixed to an inner circumference of the bracket 14. Although the illustration is omitted, one or a plurality of disk information recording mediums (hereinafter, referred to only as disks) are held by the hub part 20. In a spindle motor constituted in this manner, when the stator coil 13a is energized, excitation force generated between the stator coil 13a and the rotor magnet 13b rotates the rotor magnet 13b, and with this rotation, the disk held by the hub part 20 rotates integrally with the shaft part 9 (rotating member 12).

In this embodiment, the fluid dynamic bearing device 11 is made of the fixed member 6 and the rotating member 12.

The rotating member 12, in this embodiment, mainly includes the shaft part 9 inserted onto the inner circumference of the sleeve part 7, and the hub part 20 provided in the upper end of the shaft part 9 and arranged on the opening side of the fixed member 6.

The hub part 20 includes a disk part 20a located on the opening side (upper side) of the fixed member 6, a cylindrical part 20b extending downward in the axial direction from an outer circumferential portion of the disk part 20a, a flange part 20c protruded from the cylindrical part 10b toward the outer diameter side, and a disk loading surface 20d provided in an upper end of the flange part 20c for placing and holding the above-described disk. Among these, the flange part 20c and the disk loading surface 20d, in this embodiment, are formed integrally with the metallic hub part 20 by injection molding of a resin with the hub part 20 used as an insert component. Moreover, in this embodiment, in an inner circumference of the cylindrical part 20b, a slipping-off preventing member 21 serving as slipping-off prevention for the fixed member 6 during relative axial movement of the rotating member 12 to the fixed member 6 is provided integrally with the hub part 20 by insert molding of a resin together with the flange part 20c.

In a partial annular region of a lower end surface 20a1 of the disk part 20a, a region where a plurality of dynamic pressure grooves are arrayed is formed as a dynamic pressure generating part. In this embodiment, for example, a dynamic-pressure-groove 10a2 arrayed region having the same shape as those of FIG. 4 is formed. The above-described dynamic-pressure-groove 10a2 arrayed region is opposed to the upper end surface 8a of the housing part 8 to form the thrust bearing clearance of the thrust bearing part T described later between the dynamic-pressure-groove 10a2 arrayed region and the upper end surface 8a during the rotation of the shaft part 9 (rotating member 12) (refer to FIG. 2). Therefore, in this embodiment, the hub part 20 corresponds to a thrust member.

The tapered seal space S whose radial clearance dimension is gradually reduced upward is formed between an inner circumferential surface 20b1 of the cylindrical part 20b and the tapered surface 8b of the housing part 8 opposed to this. In a state where the inside of the fluid dynamic bearing device 11 is filled with the lubricating oil described later, an oil level of the lubricating oil is constantly maintained within the seal space S.

In this embodiment, the dynamic-pressure-groove 10a2 arrayed region is molded by press working in the lower end surface 20a1 of the hub part 20. This allows the dynamic pressure grooves 10a2 to be formed with higher accuracy and at lower cost as compared with a case where they are provided on the side of the upper end surface 8a of the housing part 8.

Figure 7:
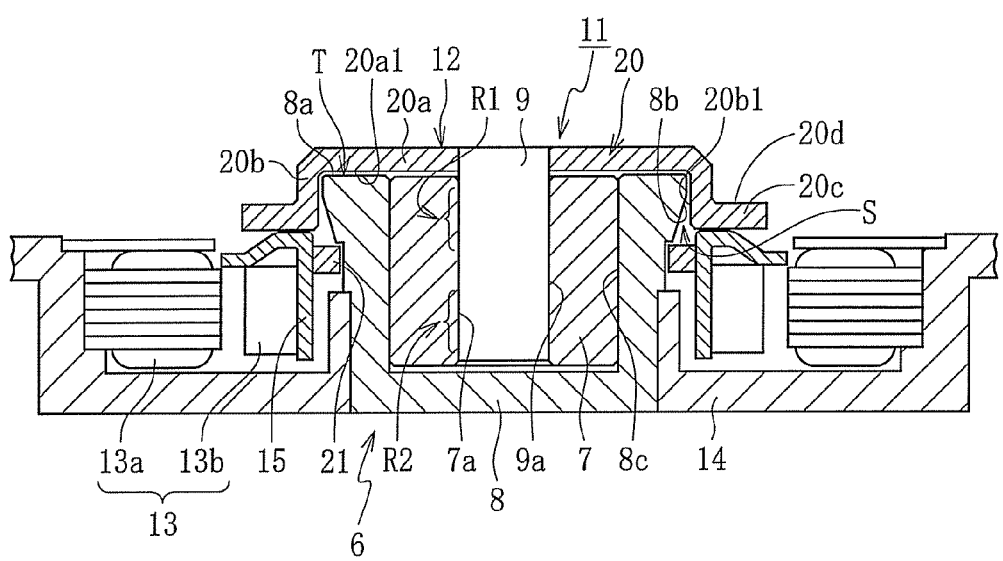
FIG. 7 is a cross-sectional view of a fluid dynamic bearing device according to another constitution.

While in this embodiment, taking into consideration press workability of the metallic hub part 20, or moldability of the dynamic-pressure-groove 10a2 arrayed region (dynamic pressure generating part), the flange part 20c having the disk loading surface 20d is formed integrally with the hub part 20 by insert molding of the resin. However, for the purpose of obtaining the disk loading surface 20d with high accuracy, for example, as shown in FIG. 7, the flange part 20c and the disk loading surface 20d can also be formed by the metallic hub part 20. In this case, the rotor magnet 13b is fixed to the hub part 20 by means such as adhesion through a yoke 15 having a magnetic shielding property.

In this embodiment (second embodiment), the metallic member other than the hub part 20 such as the yoke 15 serving as an attachment part of the rotor magnet 3b, for example, may also be a thrust member, as long as the thrust member forms the thrust bearing clearance of the thrust bearing part T between the thrust member itself and the upper end surface 8a of the housing part 8. In this case, the yoke 15 has a shape pursuant to the hub part 20 in FIG. 6, for example. Moreover, a portion of the hub part 20 may be, for example, a metallic member having the dynamic-pressure-groove 10a2 formed region, that is, a thrust member. In this case, with such a thrust member used as an insert component, the remaining portion of the hub part 20, the flange part 20c and the like can also be integrally formed of a resin.

Moreover, while in the above-described embodiments (first and second embodiments), the case where in the dynamic-pressure-groove 10a2 arrayed region formed in the lower end surface 10a1 of the holding body 10, the groove bottom surfaces of the dynamic pressure grooves 10a2 are on the same plane level as the lower end surface 10a1 adjacent to the dynamic pressure generating part is described, the upper end surfaces of the sectioning parts 10a3 provided between the respective dynamic pressure grooves 10a2 can also be formed on the same plane level as the adjacent lower end surface 10a1.

Particularly in the latter case, since a region deformed by press working is smaller, the relief portions can be smaller when the relief portions are formed in one or both of the region on the inner diameter side and the region on the outer diameter side adjacent to the dynamic-pressure-groove 10a2 arrayed region. This can further increase the working accuracy of the dynamic pressure generating part (dynamic pressure grooves 10a2).

Moreover, for the purpose of further increasing the moldability of the dynamic pressure grooves 10a2, the thrust member can be made of a sintered metal. Here, in the case where the thrust member is the holding member 10 shown in FIG. 1, for example, as sealing treatment for preventing the lubricating oil and the like intruding into the thrust member from leaking outside of the bearing, for example, an outer surface of the holding member 10 excluding the dynamic-pressure-groove 10a2 arrayed region in the lower end surface 10a1 of the disk part 10a may be covered with a resin.

Moreover, while in the above-described embodiments, the case where the fans 5, and the protruded part 10*d*, the flange part 20*c* having the disk loading surface 20*d* and the like are formed integrally with the holding member 10 or the hub part 20 by the insert molding of a resin is described, obviously, these can be formed separately from the holding member 10 or the hub part 20, and be fixed to the holding member 10 or the hub part 20 by various types of fixing means such as adhesion and press-fitting.

Moreover, in the above-described embodiments, while the outer circumferential surface of the housing part 8 forming the seal space S is the tapered surface 8*b*, this shape is not necessarily required. For example, although the illustration is omitted, the tapered surface 8*b* can be an outer circumferential surface having a constant diameter, and a seal space having a constant radial dimension can also be formed between the above-described outer circumferential surface and the inner circumferential surface of the rotating member 2 opposed to this (e.g., the inner circumferential surface 10*d*1 of the protruded part 10*d*). Alternatively, as shown in FIG. 4, in the case where the dynamic pressure generating part (dynamic pressure grooves 10*a*2) where the lubricating oil is collected toward the inner diameter side is provided, the provision of the seal space S is not necessarily required.

Moreover, while in the above-described embodiment, the case where the thrust bearing part T (thrust bearing clearance) is provided between the holding member 10 (or the hub part 20) and the housing part 8 is described, the present invention can be applied to a fluid dynamic bearing device constituted so as to be provided with an additional thrust bearing part. That is, although the illustration is omitted, the fluid dynamic bearing device can be constituted in which a flange part is provided in a lower end of the shaft part 9 to form a thrust bearing clearance between an upper end surface of the flange part and a lower end surface of the sleeve part 7 opposed to this. At this time, in either the upper end surface of the flange part or the lower end surface of the sleeve part 7, for example, a dynamic-pressure-groove arrayed region having the shape shown in FIG. 4 (the direction of the spiral is reverse) can also be formed.

Moreover, in the above-described first and second embodiments, the case where the shaft part 9 is formed separately from the holding member 10 (or the hub part 20), and is then fixed is described, for example, the shaft part 9 and the holding member 10 (or the hub part 20) can also be both formed of a metal as long as this configuration does not adversely affect the moldability of the dynamic pressure grooves 10*a*2 (dynamic pressure generating part).

Moreover, the components of the fluid dynamic bearing device 1 excluding the holding member 10 and the shaft part 9 need not be limited to those in the above-described embodiments, either. For example, although the illustration is omitted, the present invention can be applied to a fluid dynamic bearing device in which the components are integrated, such as a case where the housing part 8 and the sleeve part 7 are integrally formed of the same material (the fixed member 6 is a single component).

Furthermore, the present invention is not limited to the fluid dynamic bearing devices constituted as described above, but can be applied to any fluid dynamic bearing device, as long as it is a fluid dynamic bearing device including a radial bearing clearance formed between a fixed member and a rotating member, a first end of which is on the hermetically sealed side, and a second end of which is on the atmosphere opening side, a thrust bearing clearance formed between the fixed member and the rotating member, and leading to the atmosphere opening side in the radial bearing clearance, and the above-described thrust member.

Moreover, while in the above-described embodiments, the constitution is exemplified in which the dynamic pressure effect of the lubricating oil is generated by the herringbone or spiral dynamic pressure grooves as the radial bearing parts R1, R2 and the thrust bearing part T, the present invention is not limited to this.

For example, as the radial bearing parts R1, R2, although the illustration is omitted, a so-called stepped dynamic pressure generating part in which the grooves in the axial direction are formed in a plurality of positions in the circumferential direction, or a so-called multi-arc bearing in which a plurality of circular arc surfaces are arrayed in the circumferential direction, and a wedge-shaped radial clearance (bearing clearance) is formed together with the opposed completely-round outer circumferential surface 9*a* of the shaft part 9 may also be adopted.

Alternatively, the inner circumferential surface 7*a* of the sleeve part 7 can be a completely-round outer circumferential surface where neither dynamic pressure grooves nor circular arc surfaces are provided as the dynamic pressure generating part, so that a so-called completely round bearing is formed together with the completely-round outer circumferential surface 9*a* of the shaft part 9 opposed to this inner circumferential surface 7*a*. In this case, the fixed member 6 can be an integrated part easily, so that further reduction in manufacturing cost can be achieved.

Moreover, although the illustration is also omitted, the thrust bearing part T can be constituted as a so-called stepped bearing in which a plurality of dynamic pressure grooves each having a radial groove shape are provided at predetermined intervals in the circumferential direction in the region where the dynamic pressure generating part is formed (e.g., in the lower end surface 10*a*1 of the holding member 10 or the like), a so-called corrugated bearing (an end surface is corrugated to form a harmonic waveform or the like), or the like.

Moreover, while in the above description, the lubricating oil is exemplified as a fluid filled into the fluid dynamic bearing device 1 to generate the dynamic pressure effect in the radial bearing clearance and the thrust bearing clearance, a fluid other than this that can generate the dynamic pressure effect in the respective bearing clearances, for example, a gas such as air, a lubricant agent having fluidity such as a magnetic fluid, a lubricating grease or the like can be used.

The invention claimed is:
1. A fluid dynamic bearing device comprising:
   a fixed member;
   a rotating member including a shaft part;
   a radial bearing clearance formed between the fixed member and the rotating member, a first end of which is on the hermetically sealed side, and a second end of which is on the atmosphere opening side;
   a thrust bearing clearance formed between the fixed member and the rotating member and leading to the atmosphere opening side of the radial bearing clearance;
   a thrust member provided in the rotating member and forming the thrust bearing clearance between the fixed member and thrust member; and
   a dynamic pressure generating part for generating a dynamic pressure effect of a fluid in the thrust bearing clearance,
   wherein the thrust member is formed of a metal and is directly attached to one end of the shaft part, and the dynamic pressure generating part is molded in the thrust member by press working.

2. The fluid dynamic bearing device according to claim 1, wherein the dynamic pressure generating part and the thrust member are both molded by press working.

3. The fluid dynamic bearing device according to claim 1, wherein the thrust member and a disk loading surface are both provided in the rotating member.

4. The fluid dynamic bearing device according to claim 1, wherein the rotating member further has a fan formed integrally with the thrust member by injection molding of a resin with the thrust member used as an insert component.

5. The fluid dynamic bearing device according to claim 1, wherein the thrust member includes at least a disk part formed of a plate part, and a cylindrical part extending in an axial direction from an outer circumferential edge of an end surface of the disc part on which the dynamic pressure generating part is provided, the disc part and the cylindrical part having a constant thickness.

* * * * *